Feb. 19, 1924.

F. STONE

ROTARY DRILL

Filed May 23, 1922

INVENTOR
*Frederick Stone.*
BY
ATTORNEY

Feb. 19, 1924.

F. STONE

ROTARY DRILL

Filed May 23, 1922

INVENTOR
Frederick Stone.
BY
ATTORNEY

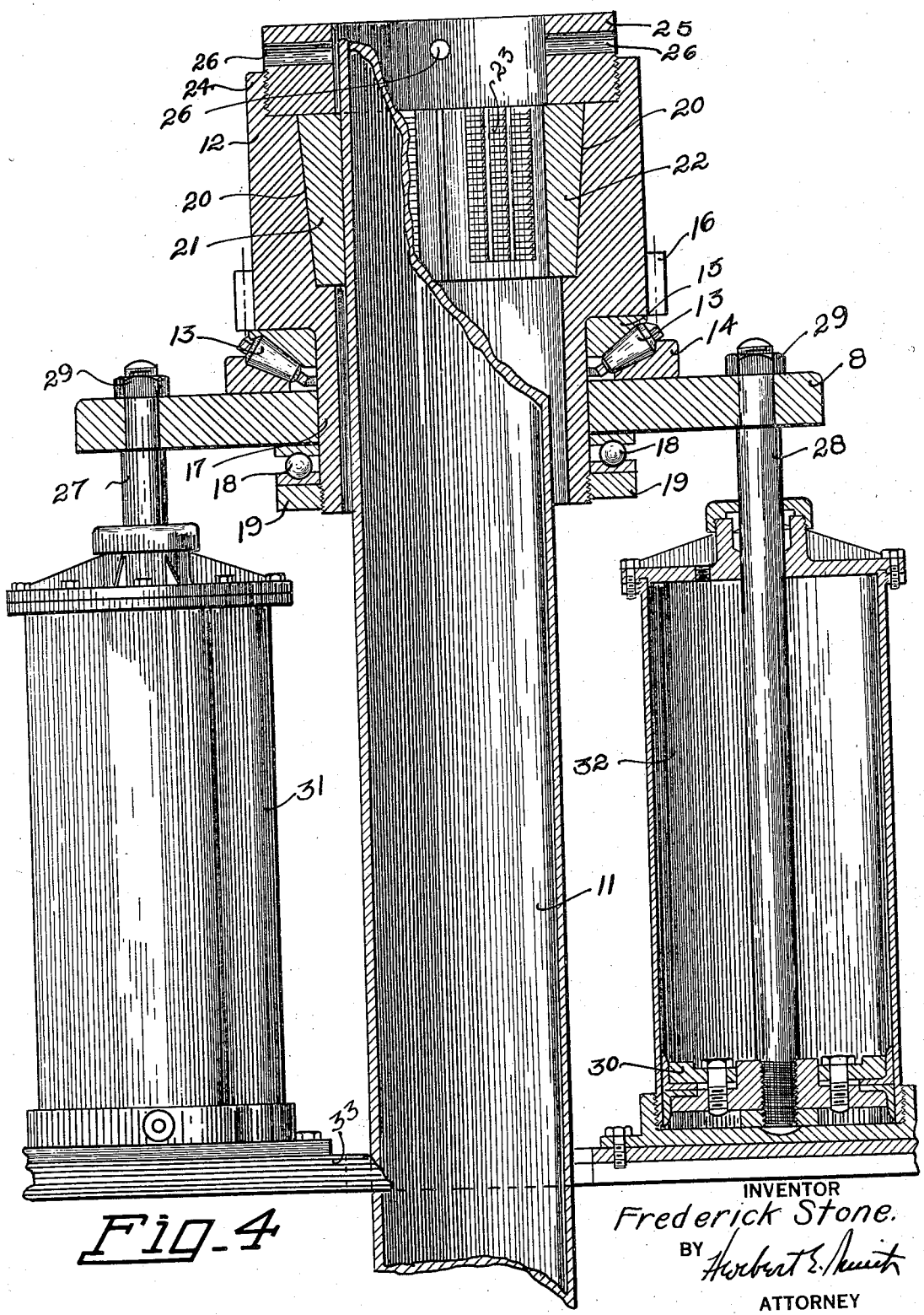

Patented Feb. 19, 1924.

1,484,362

UNITED STATES PATENT OFFICE.

FREDERICK STONE, OF SPOKANE, WASHINGTON, ASSIGNOR TO DIAMOND DRILL CONTRACTING COMPANY, OF SPOKANE, WASHINGTON.

ROTARY DRILL.

Application filed May 23, 1922. Serial No. 563,029.

*To all whom it may concern:*

Be it known that I, FREDERICK STONE, a citizen of the United States, residing at Spokane, in Spokane County and State of Washington, have invented certain new and useful Improvements in Rotary Drills, of which the following is a specification.

My present invention relates to improvements in rotary drills especially adapted for use in connection with earth boring or drilling; for oil, gas, Artesian and other wells, wherein a rotary drilling mechanism is employed for rotating the drill rod. The primary object of the invention is the provision of means for connecting the driving mechanism for the rotary drill at one side of the drill head, thus leaving the upper portion of the head free for the ready insertion or withdrawal of drill rod sections, and in connection with this arrangement of parts I utilize hydraulically actuated means for elevating the drill head, or permitting the same to be lowered. By means of the hydraulic mechanism power may also be imparted to the drill head for bearing down upon the drill to impose the required weight when the drill or bit is passing through hard materials. The drill head is further improved by the employment of a novel and effective clutch mechanism for connecting or disconnecting the rotary head to or from the drill rod, and the invention involves other novel features and combinations and arrangements of parts as will be hereinafter more fully described and claimed.

In the accompanying drawings I have illustrated one complete example of the physical embodiment of my invention, wherein the parts are combined and arranged according to the best mode I have thus for devised for the practical application of the principles of my invention.

In the drawings:—

Figure 4 is a front, sectional view of the mechanism of my invention one of the hydraulic cylinders being shown in elevation, and parts being broken away for convenience of illustration.

Figure 1:
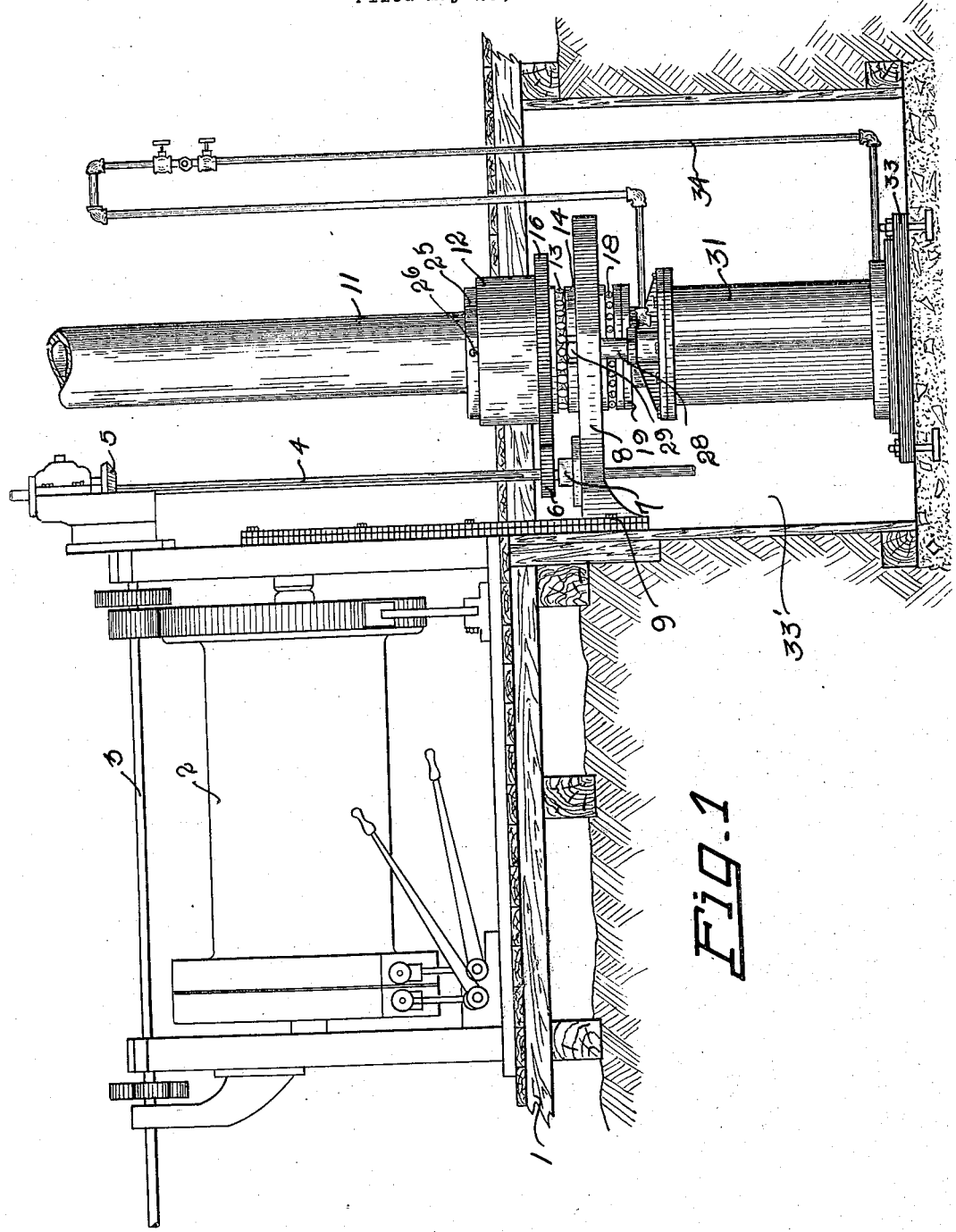
Figure 1 is a view in side elevation of a drilling machine of well known type to which the mechanism of my invention is applied in operative position.
Figures 2, 3:
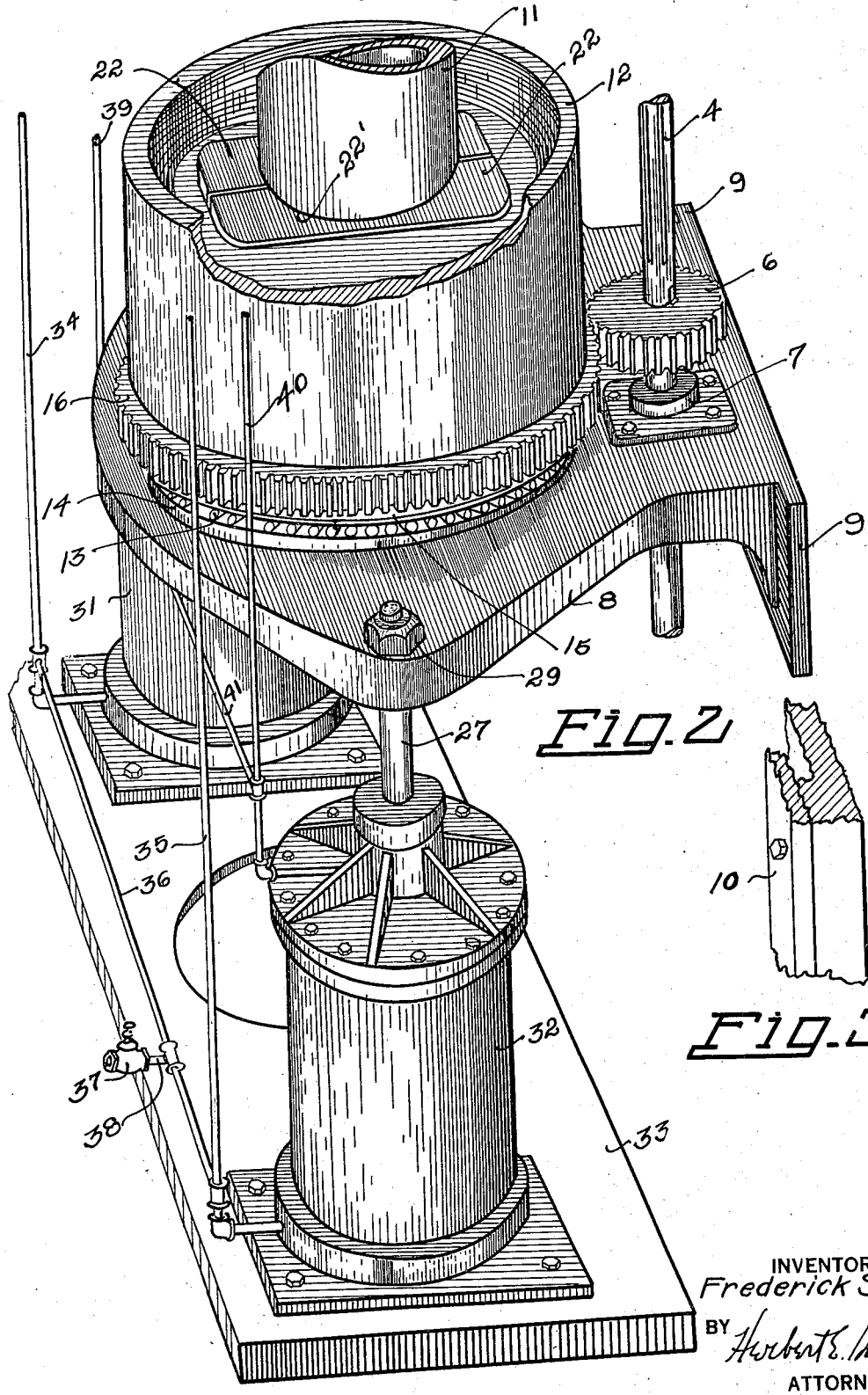
Figure 2 is an enlarged, detail perspective view showing the rotary drill head and its supporting cross-head and accessories.
Figure 3 is a detail, fragmentary view of one of the cross head slide plates or guides.

In Figure 1 I have shown one exemplification of my invention applied to a drilling machine of standard type, but it will be understood that the subject matter of the invention may with equal facility be applied to other rotary drilling equipment, whether driven by electricity, steam, or gas power.

The machine of Figure 1 is supported on an adequate base 1 and has the usual drum 2 and main driving shaft 3, horizontally disposed. The vertical power shaft 4 is properly journaled and revolved from the driving head 5 in usual manner and at its lower end is provided with a driving pinion 6. For the purpose of my invention, the power shaft 4 is reciprocable vertically as well as being rotated horizontally, the latter being a continuous but reversible motion, and the reciprocation of the shaft being accomplished only when necessary as will be pointed out.

The power shaft has a journal bearing at 7 in a horizontally disposed cross head 8, located at the front of the machine, normally below the surface level or floor line of the drilling machinery. The cross head is vertically reciprocable, and has at its rear a pair of lateral guide flanges 9, 9, slidable in the vertically disposed grooved guide plates 10, rigidly bolted at the front of the drilling machinery, in order that the cross head may be held in stable horizontal position either when stationary or being moved vertically.

The tubular drill rod 11 shown in the drawings is passed through the cross head, but is rigidly held by the rotary drill head 12 supported on the cross head and vertically movable therewith. The rotary drill head is rotatable with relation to the cross head and is supported above the cross head on roller bearings 13 disposed between the concave ring 14 and convex ring 15, which rings are retained between the cross head and rotary head.

At its base the rotary drill head is fashioned with an exterior gearing or gear ring 16 and below the base is provided a reduced cylindrical bushing 17 which passes through the roller bearing rings and the cross head.

Below the cross head the rotary drill head is held thereto by ball bearing 18 and the retaining ring 19 threaded on the exterior of the bushing 17. Thus it will be apparent that the relatively rotatable drill head is supported and retained by the cross head, and may also be elevated or lowered together with the drill rod 11 when such movement is imparted to the cross head.

The rotary drill head is fashioned in the form of an open cup with a cylindrical exterior, but a polygonal tapered socket or recess 20 in its interior through which the drill rod 11 is passed. Within the socket are seated a pair of opposed, complementary wedge blocks 21 and 22 provided with semicircular grooves 22' to fit about the drill rod, and the faces of these grooves may be fashioned with friction teeth 23 to assist in gripping the drill rod on its periphery. These two wedge blocks form a split clutch member for the drill rod, and the drill head is counterbored at 24 to receive a clutch nut 25 threaded into the counterbored recess of the drill head. Thus by placing a bar or tool in the holes 26 of the nut, the latter may be screwed into the drill head with a bearing on the upper faces of the wedge blocks, to force these wedge blocks into their socket and into tight frictional engagement with the drill rod. With these parts thus engaged the drill head and drill rod may be revolved for drilling operations through the power shaft, pinion 6 and the gearing or gearing ring 16 on the drill head.

The cross head is directly supported on a pair of spaced piston rods 27 and 28 that are secured to the head by nuts 29, and each of these rods has a piston 30 movable in one or the other of the two cylinders 31, 32.

The two cylinders are rigidly supported on a base 33 located at the bottom of a pit 33', and are disposed below the cross head at the sides of the drill rod as seen in Figure 4.

Motive fluid may be admitted either to the top or the bottom of the cylinders, above or below the pistons in their cylinders, and preferably oil or water is used for this purpose.

Two sets of pipes are utilized to supply and drain the cylinders, the two pipes 34 and 35 connected at the lower ends of the cylinders being connected by a cross pipe 36 which is equipped with a release valve 37 and branch pipe 38. The check valve is set at a predetermined pressure, and is opened to permit escape of water should an excessive pressure arise in the cylinders below their pistons, thus gradually permitting escape of the excess pressure and cushioning the movement of the pistons.

Water under pressure is also supplied to the tops of the cylinders above their pistons through pipes 39 and 40, the crosspipes 41 which connects these pipes being utilized to equalize the water pressure.

The pressure of water imposed on the tops of the pistons, when they are in elevated positions, will afford adequate weight or load to hold the drill rod and its bit to working position, and the load is continuously imposed by depressing the pistons, as the drilling progresses. As the water under pressure is forced into the cylinders at the top above the pistons, the water below the pistons is simultaneously drained therefrom in such manner as to stabilize the movement of the pistons to insure a continuous application of force to the driven drill rod, as it is fed to its work. By the utilization of the hydraulic pressure in the cylinders adequate weight is imparted to the short drill rod at the commencement of the drilling to hold it to its work and compensate for the absence of a long length, and consequent weight, of the drill rod, thus insuring speed for the initial operations of the drill as the bit enters the rock.

In the operation of pulling rods out of the well or hole, the drill rod is clutched by the drill head, and with the pistons in position of Figure 4, water pressure introduced in the lower ends of the cylinders below their pistons, will elevate the latter carrying with them the cross head and drill head which clutches the rod. This operation of elevating the drill rod may be repeated as required to elevate or lift the drill rods from the hole, the rod clamp or clutch of the drill head being manipulated as required.

The mounting of the rotary drill head upon the hydraulic supports, independent of the operating parts of the drilling machinery, renders the machine of my invention applicable for use with many types of drilling machines, and insures a positive and accurately-controlled downward or upward movement to the drill rods. The use of my machine also dispenses with the necessity of jacks frequently used and required for pulling tight casings or rods from the well, as the lifting force of the hydraulic cylinders may be used in combination with the cable-pulling system, or independent thereof.

The rotary drill head, thus suspended is readily adapted for screwing together, or unscrewing, the rod sections for entering the hole or being withdrawn therefrom, in connection with the clutch or clamp in the head, and these operations may be performed without necessity for moving any of the operating parts of the machine.

It will be understood that means other than the pinion 6 and gear 16 may be employed for rotating the drill head, and the drill head may be rotated from other types of drilling machines employing different means for transmitting power to the rotary drill head.

The simplicity of the machine and the minimum number of parts employed permits facile assembling or taking down of the machine, and because of the comparatively light weight of the machine the latter may be transported with convenience and dispatch.

Regular rotary drilling bits may be used in drilling soft rock, and a diamond bit may be substituted for drilling in hard rock without increasing the weight of the drilling implements, but with the same speed and accuracy.

A decided advantage of my construction lies in the ability to get a long-stroke piston without a top-heavy construction. Hithertofore it has been necessary in many machines for the operator to work from a platform, putting out of his reach other parts of the mechanism which made it necessary for him to be on the floor level at times and at other times on the platform, and sometimes he would be required in both places at the same time. I have overcome this in a way that lightens the burden of operation and saves a complicated construction.

Having thus fully described my invention, what I claim as new and desire to secure by Letters Patent is—

1. The combination in a drilling machine with a vertically reciprocable cross head and means for operating said head, of a relatively rotatable drill head carried in said cross head, means in said drill head for clamping a drill rod, and means for rotating said drill head.

2. The combination in a drilling machine with a vertically reciprocable cross head, and hydraulic mechanism for operating said cross head, of a relatively rotatable drill head carried by the cross head, bearings for said drill head above and below and co-acting with said cross head, clamping means for a drill rod carried by said drill head, and means for driving said drill head.

3. The combination with a vertically reciprocable cross head and operating means therefor, of a relatively rotatable drill head having a guide bushing in an opening in said cross head, anti-friction bearings for said drill head above and below the cross head, means for rotating said head, and a clamping device carried by said head for securing the latter to a drill rod.

4. The combination with a reciprocable cross head and an open, relatively rotatable drill head carried by said cross head, of wedge shaped clamping blocks carried by said drill head, and means for forcing said blocks into engagement with a drill rod.

5. The combination in a drilling machine with an open center rotary drill head having a tapering socket, of a pair of wedge shaped clamping blocks in said socket, and a threaded nut in said drill head adapted to force the blocks into clamping engagement with a drill rod.

6. The combination with an open center, reciprocable cross head, of a rotary drill head having a bearing bushing in said cross head, anti-friction bearings between said drill head and cross head, and means for revolving the drill head, of wedge shaped clamping blocks seated in a socket in the drill head, and a clamping nut threaded in the open end of said socket for forcing the blocks into frictional engagement with a drill rod.

7. The combination with a vertically reciprocable cross head and a relatively rotatable drill head carried thereby, of a plurality of cylinders each having a piston rod connected to the cross head and pistons on said rods, means for introducing fluid under pressure to said cylinders, and means for releasing excess pressure in said cylinders to cushion the movement of the pistons.

8. The combination with a vertically reciprocable cross head and a relatively rotatable drill head, of a plurality of cylinders each having a piston rod connected to said cross head and pistons on said rods, motive fluid pipes connected to the upper ends of said cylinders and motive fluid pressure pipes connected to the lower ends of said cylinders, a cross pipe connecting the latter pipes, and a release valve for excess pressure in said cross pipe.

In testimony whereof I affix my signature.

FREDERICK STONE.